United States Patent [19]

Nagase et al.

[11] Patent Number: 4,734,624
[45] Date of Patent: Mar. 29, 1988

[54] DISCHARGE LAMP DRIVING CIRCUIT

[75] Inventors: Haruo Nagase, Yawata; Kiyoaki Uchihashi, Moriguchi, both of Japan

[73] Assignee: Matsushita Electric Works, Ltd., Osaka, Japan

[21] Appl. No.: 883,803

[22] Filed: Jul. 9, 1986

[30] Foreign Application Priority Data

Jul. 25, 1985 [JP] Japan ................... 60-164388
Jul. 25, 1985 [JP] Japan ................... 60-164389

[51] Int. Cl.$^4$ ............... H05B 37/00; H05B 39/04; H05B 41/07
[52] U.S. Cl. .................... 315/243; 315/225; 315/226; 315/174; 315/205; 315/DIG. 2; 315/DIG. 5; 315/DIG. 7; 315/209 R; 363/17; 363/56; 363/132
[58] Field of Search ........... 315/DIG. 2, DIG. 5, 315/DIG. 7, 283, 243, 244, 174, 176, 225, 226, 206, 205, 209 R; 363/17, 56, 132

[56] References Cited

U.S. PATENT DOCUMENTS

| | | | |
|---|---|---|---|
| 3,789,266 | 1/1974 | Polman et al. | 315/DIG. 5 X |
| 4,170,747 | 10/1979 | Holmes | 315/DIG. 7 X |
| 4,213,103 | 7/1980 | Birt | 363/132 X |
| 4,291,254 | 9/1981 | Arlt et al. | 315/240 |
| 4,346,332 | 8/1982 | Walden | 315/307 |
| 4,388,563 | 6/1983 | Hyltin | 315/205 |
| 4,547,706 | 10/1985 | Krummel | 315/DIG. 7 X |
| 4,595,863 | 6/1986 | Henning | 315/DIG. 5 X |
| 4,603,378 | 7/1986 | Virta | 363/56 X |

Primary Examiner—Leo H. Boudreau
Assistant Examiner—Mark R. Powell
Attorney, Agent, or Firm—Armstrong, Nikaido, Marmelstein & Kubovcik

[57] ABSTRACT

A circuit for operating a discharge lamp at a low frequency AC voltage while repetitively interrupting at a high frequency the voltage component to be applied to the lamp. The circuit includes at least one switching transistor for repetitively interrupting the voltage to be applied to the lamp at the high frequency, for example, 40 KHz so as to allow the use of a light and less bulky inductor as the current limiting conductor to be connected in series with the lamp. A bridge inverter is provided to have at least one pair of switching transistors for alternately reversing a DC voltage to apply the resulting AC voltage to the lamp at the low frequency, for example, 100 Hz low enough to stably operate the lamp without suffering from acoustic resonance. The high frequency component is bypassed through a by-pass capacitor connected in parallel with the lamp. By reason of the inverter producing the low frequency AC voltage, the circuit requires all-off period during which the switching transistors of the bridge inverter are simultaneously off for preventing the short circuiting of the power source. An oscillation-inducing inductor is connected in series with the lamp in parallel relation to the bypass capacitor so as to form a series oscillating circuit which causes to flow an alternating oscillating current to the lamp circuit throughout the all-off period. The resulting oscillating lamp current continues for a longer time to thereby retard the deionization of the lamp. Accordingly, the all-off time can be extended to such an extent as to give greater flexibility in designing the circuit which is free from short circuiting of the power source as well as from the increased reignition voltage.

5 Claims, 10 Drawing Figures

DISCHARGE LAMP DRIVING CIRCUIT

BACKGROUND OF THE INVENTION

1. Field of the Invention

The present invention is directed to a discharge lamp driving circuit, and more particularly to a circuit for operating a gaseous discharge lamp utilizing a bridge inverter having a relatively low switching frequency.

2. Description of the Prior Art

There has been a growing demand for discharge lamp operating circuits which are operated at a higher frequency in order to reduce the weight and bulk of the ballasting inductor. On the other hand, it is known that discharge lamps, particularly high-pressure discharge lamps such as mercury high pressure lamps and sodium vapor lamps suffer from unstable discharge arcs due to "acoustic resonance" when operated at certain high frequencies which will vary in different lamps but normally lies within the high frequency range between 10 KHz to 100 KHz. Thus, the high pressure discharge lamp is required to be operated at a frequency low enough with respect to the high frequency in which the acoustic resonance is expected. One known scheme for satisfying the above two conflicting requirements is shown in U.S. Pat. No. 4,170,747 which utilizes a bridge inverter including two pairs of switching elements or transistors for operating the discharge lamp connected in series with the ballasting or current limiting inductor across the output terminals of the bridge inverter. One pair of the switching transistors operates at a lower frequency for alternately applying a dc voltage in opposite polarity to the lamp for the purpose of avoiding the acoustic resonance, while the other pair of the switching transistors operates to repetitively interrupt the dc voltage being applied to the lamp at a higher frequency in order to reduce the bulk and weight of the current-limiting inductor involved to a considerable extent. The high frequency component is bypassed through a capacitor connected across the lamp and will not induce the acoustic resonance. In view of the low switching frequency at which the bridge inverter provides the alternating voltage to the lamp, this patent also envisages the prevention of short circuiting of the power source by providing an all-off period during which all of the transistors are off or nonconducting. In other words, the transistors of the bridge inverter would be possibly damaged due to the short-circuiting of the power source without the provision of the all-off period. At the initial stage of the all-off period, the inductor and the capacitor connected to the lamp act to continuously cause the lagged current to flow to the lamp to maintain the lamp in the conductive state. However, this lamp current with progressively decreased amplitude flows only in one direction and therefore will be reduced to zero only in a short time. When the lamp current completely ceases within the all-off period, the lamp requires a higher reignition voltage at the subsequent conduction of the switching transistor of the bridge inverter, which higher reignition voltage could disadvantageously lead to extinction, or at least the flickering of the lamp.

This poses a problem that the all-off period is substantially limited to a reduced duration which may not be safe enough for preventing the short-circuiting of the power source in consideration of the inevitable characteristic variations of the electric components forming the circuit. In other words, the extinction or flicker problem will be critical when the circuit is designed to provide the all-off period of enough duration for prevention of the short-circuiting of the power source. In this sense, the prior art circuit is not satisfactory for stable lamp operation.

SUMMARY OF THE INVENTION

The present invention eliminates the above problem by incorporating an oscillating circuit which causes an alternating current to flow to the lamp throughout the course of the all-off period so as to elongate the all-off period while assuring that the lamp current will continuously flow during the entire all-off period. A discharge lamp driving circuit in accordance with the present invention comprises a DC voltage source, a discharge lamp, a current limiting inductor inserted in series between the voltage source and the lamp, and means for operating the lamp at a low frequency AC voltage while repetitively interrupting at a high frequency the voltage component to be applied to the lamp. Said means comprises a bridge inverter having at least one pair of switching elements controlled to alternately reverse the DC voltage at the low frequency so as to apply the resulting AC voltage to the lamp at the low frequency, and switching means for repetitively interrupting at the high frequency the voltage component to be applied to the lamp. Included in the circuit is a control means for providing the all-off period during which the switching elements of the bridge inverter are simultaneously off for a predetermined time interval at the polarity reversal of the voltage being applied to the lamp in order to prevent the power source from being short circuited. A bypass capacitor is connected in parallel with the lamp for bypassing the high frequency component resulting from the high frequency interrupting operation of the switching means. Because of the bridge inverter reversing the voltage at the low frequency, for example, 100 Hz for providing the AC voltage to the lamp, the lamp can be free from acoustic resonance which is harmful to the lamp operation and would arise when operated at the higher frequency range of about 10 KHz to 100 KHz. Also, because of the high frequency at which the voltage being applied to the lamp is repetitively interrupted, the current limiting inductor in series with the lamp can be of less inductive value and therefore be of less weight and bulk, enabling the physical circuit arrangement to be made compact.

The characterizing feature of the present invention resides in that an oscillation-inducing inductor is connected in series with the lamp in parallel relation with the bypass capacitor so as to form with the capacitor a series oscillating circuit which causes an alternating oscillating current to flow to the lamp throughout the all-off period. The resulting oscillating current tends to continuously flow through the lamp for a longer time to thereby retard the deionization of the lamp, allowing the all-off period to be extended to such an extent as to securely and reliably prevent the short-circuiting of the power source, yet assuring the lamp current to continuously flow throughout the all-off period for maintaining the reignition voltage at a minimum. The extended all-off period without the interruption of the lamp current can greatly contribute to flexibility in designing the discharge lamp circuit.

Accordingly, it is a primary object of the present invention to provide a discharge lamp driving circuit which is capable of stably operating the lamp in such an operational mode free from the acoustic resonance and from the increased reignition voltage and at the same time reliably preventing the short circuiting of the power supply, while retaining the compact physical arrangement of the circuit.

In a preferred embodiment, the oscillation-inducing inductor is selected to have such an inductive value such that the all-off period terminates at a moment when the voltage appearing across the bypass capacitor during the operation of the oscillating circuit is in a subtractive relation to the voltage to be applied across the same capacitor in the subsequent operation of turning on the switching element with respect to the polarity of the voltage. This scheme is a safeguard against possible danger of a surge current rushing through the current limiting inductor into the bridge inverter circuit. Such surge current is probable if the all-off period be terminated at the timing when the voltage appearing across the bypass capacitor due to the oscillating voltage is in additive relation to the voltage to be applied by the inverter to that capacitor in the subsequent switching operation. That is, upon this occurrence the potential due to the energy remaining in the capacitor during the oscillation of the alternating lamp current flowing during the all-off period adds an extra voltage of considerable amplitude to the voltage to be applied by the inverter in the subsequent operation so that the surge current will be caused to rush through the current limiting inductor into the bridge inverter circuit. The resulting surge current is likely to magnetically saturate the current limiting inductor so as to considerably detract from the its current-limiting effect, which adversely causes the inductor to have an unduly larger inductive value or heavy and bulky construction for keeping the lamp operation stable, and thus failing to provide the compact arrangement of the the physical lamp driving circuit. Further, the surge current tends to give undesirable stresses to switching transistors utilized in the bridge inverter so as to destroy the transistors or at least be the cause of the switching loss thereof. The above disadvantages can be successfully avoided by incorporating the above scheme which determines the timing occurrence of the application of the voltage by the inverter to the bypass capacitor immediately after the all-off period. Such timing can be easily determined by suitably selecting the inductance of the oscillation-inducing inductor in relation to the predetermined capacitance and resistance of the bypass capacitor and the lamp.

It is therefore another object of the present invention to provide a discharge lamp driving circuit which can prevent the occurrence of the surge current flowing through the current limiting inductor into the bridge inverter, ensuring stable lamp operation without adding any extra circuit components.

In accordance with another aspect of the present invention, there is incorporated a starting circuit for the lamp. The starting circuit comprises a pulse transformer having a primary winding and a secondary winding, a pulse supply capacitor connected to the primary winding of the pulse transformer, and electric means for effecting the discharging of the pulse supply capacitor so as to produce a high open circuit ignition voltage across the lamp over said bypass capacitor. The secondary winding of the pulse transformer defines itself as the second inductor forming the oscillating circuit including the lamp. Thus, the oscillating circuit can be achieved by better utilization of the starting circuit included in the discharge lamp circuit, which is therefore a further object of the present invention.

These and other advantageous features will be more apparent from the following detailed description of the preferred embodiments of the present invention when taken in conjunction with the accompanying drawings.

DETAILED DESCRIPTION OF THE PREFERRED EMBODIMENTS

Figure 1:
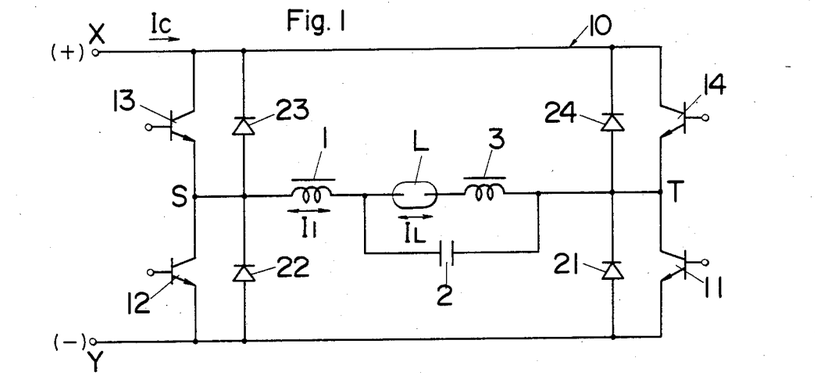
FIG. 1 is a schematic diagram of a discharge lamp driving circuit in accordance with a preferred embodiment of the present invention.

Referring now to FIG. 1, there is shown a discharge lamp driving circuit in accordance with a preferred embodiment of the present invention. The circuit includes a transistorized bridge inverter 10 having the input terminals X and Y connected to a DC voltage power source which is obtained from a conventional 50 or 60 Hz ac power supply by being rectified and filtered. A series combination of a discharge lamp L and a current limiting inductor 1 is connected across the output terminals S and T of the bridge inverter 10. The discharge lamp L may be a high pressure gaseous discharge lamp such as mercury high pressure discharge lamp with metal halogen additives, sodium vapor lamp, or the like.

The bridge inverter 10 includes a pair of switching transistors 11 and 12 which are controlled to be alternately conductive and nonconductive at a low frequency, for example, about 100 Hz to apply an alternating voltage to the series combination of the lamp L and the current limiting inductor 1. Also included in the bridge inverter 10 are another pair of switching transistors 13 and 14 which are controlled in such a manner that each of the switching transistors 13 and 14 is cooperative with one of the switching transistors 11 and 12 to repetitively interrupt the voltage applied to the lamp L at a high frequency, for example. 40 KHz, so long as the complementary switching transistor 11 or 12 is conductive. In this sense, the above switching transistors 11 and 12 are referred hereinafter to as LF [low frequency] switching transistors, and the switching transistors 13 and 14 as HF [high frequency] switching transistors. The collector-emitter paths of the LF transistors 11 and 12 are bridged respectively by diodes 21 and 22 each having its anode connected to the common line of the circuit. Likewise, the collector-emitter paths of HF transistors 13 and 14 are bridged respectively by diodes 23 and 24 each having its cathode connected to the high voltage line of the circuit. A high frequency bypassing capacitor 2 is connected in parallel with the lamp L.

In operation, when the LF switching transistor 11 is conductive, the remaining LF transistor 12 is kept nonconductive and the HF transistor 13 repeats its on-off cycle to apply an intermittent DC voltage to the lamp L. When the HF transistor 13 is conductive, a closed loop is established which causes a current to flow through the HF transistor 13, inductor 1, the parallel circuit of lamp L and bypass capacitor 2, and the complementary LF transistor 11. At the moment when the HF transistor 13 is off, the energy stored in the inductor 1 in the previous on-condition of the same transistor causes a lagged current to flow in the same direction through the lamp L, LF transistor 11, diode 22 so that the lamp current $I_L$ will continue to flow so long as the LF transistor 11 is conductive, as is apparent from pertinent waveforms illustrated in FIG. 2. Likewise, when the LF switching transistor 12 is conductive, the remaining LF transistor 11 is kept nonconductive and the HF transistor 14 repeats its on-off cycle to apply an intermittent dc voltage to the lamp L. When the HF transistor 14 is on, a closed loop is established in which a current flows through HF transistor 14, the parallel circuit of lamp L and bypass capacitor 2, inductor 1, and the complementary LF transistor 12 being conductive. The resulting lamp current $I_L$ flows in the opposite direction. At the moment when the HF transistor 14 is off, the energy stored in the inductor 1 in the previous on condition of the same transistor causes a lagged current to flow in the same direction through the LF transistor 12, diode 21, the lamp L, and the bypass capacitor 2 so that the lamp current $I_L$ will continue to flow so long as the LF transistor 12 is conductive.

In this way, the low frequency alternating voltage which is repetitively interrupted at the high frequency is applied to the series combination of the lamp L and the current limiting inductor 1 to operate the lamp L. The bypass capacitor 2 connected across the lamp L is for bypassing the high frequency component resulting from the repetitive interruption of each HF switching transistor 13, 14 and to only pass the low frequency component through the lamp L so that the lamp L can be operated in a stable mode without being subjected to the high frequency component which may be the cause of acoustic resonance and therefore be harmful to the lamp operation. Thus, the lamp L can be operated substantially at the low frequency so as to avoid the harmful acoustic resonance while requiring less inductive value, or less bulk for the current limiting inductor 1 due to the high frequency at which the voltage is repetitively interrupted. For achieving the bypassing operation of the capacitor 2, it is preferred that the capacitor 2 has the impedance of about ⅓ to 1/10 that of the current limiting inductor 1 at the high frequency of 40 KHz of the HF switching transistors 13 and 14.

By reason on the bridge inverter 10 being operated to alternately reverse the interrupted voltage at the low frequency, it is required to provide at the polarity reversal of the voltage an all-off period $T_{OFF}$ in which all of the transistors 11, 12, 13, and 14 are simultaneously off in order to prevent the short circuiting of the power source, which short circuiting would certainly destroy the transistors. The all-off period $T_{OFF}$ is determined to be considerably shorter than the on-period of the LF transistor 11, 12 but greater than the on-period of the HF transistor 13, 14 and normally within the range of about 50 to 200 $\mu$sec. It is to be noted at this time that an oscillation-inducing inductor 3 is connected in series with the lamp L such that the oscillation-inducing inductor 3 is in parallel relation to the bypass capacitor 2 and forms therewith a series oscillating circuit which causes to flow an oscillating or alternating current through the lamp L throughout the all-off period $T_{OFF}$ to retard the deionization of the lamp L, maintaining the reignition voltage at a minimum and therefore assuring stable lamp operation. Although in the absence of the oscillating circuit, at the initial stage of the all-off period $T_{OFF}$, the energy stored in the current limiting inductor 1 causes a current $I_1$ to continuously flow to the lamp L as illustrated by the waveforms in FIG. 2 and immediately thereafter the energy stored in the bypass capacitor 2 causes a current $I_L$ to flow to the lamp L as indicated by dotted line in the waveforms of the current $I_L$ in FIG. 2, the resulting current is allowed to flow only in one direction and is decreased to zero only in a short time. Thus, such lamp current would be likely to terminate before the end of the all-off period which is determined to be long enough to reliably prevent the short circuiting of the power source. If this occurs, the reignition voltage at the subsequent switching operation of conducting the HF transistor 14 becomes extremely high, as indicated by dotted lines in the waveforms of voltage $V_L$ being applied across the lamp L, resulting in the extinction or at least flicker of the lamp L. In fact, the high pressure discharge lamp with metal halogen additives is more likely to be extinguished upon the interruption of the lamp current and is therefore mostly desired to be operated without any interruption of the lamp current.

In view of the above, the above oscillating circuit is incorporated to continuously cause the lamp current to flow throughout the extended all-off time for ensuring stable lamp operation while assuring the successful prevention of the short circuiting. That is, the oscillating lamp current $I_L$ can continue to flow with its polarity reversed during the all-off period $T_{OFF}$, as best illustrated by solid lines of the waveforms in FIG. 2. In other words, the oscillation of the lamp current $I_L$ serves to extend the all-off period $T_{OFF}$ without stopping the lamp current $I_L$ in that period. In fact, when the oscillation-inducing inductor 3 having an inductive value $L_1$ of 5 mH is combined with the bypass capacitor 2 having a capacitive value $C_2$ of 0.2 $\mu$F, the oscillating frequency f is calculated from the known formula $f=1/(2\pi\sqrt{L_1 \times C_2})$ to be approximately 5 KHz. This means that the oscillating current has the one-cycle period of about 200 $\mu$sec, which is long enough with respect to the all-off period. Practically, the period is further extended due to the fact that the resistive value of the lamp L acts to lower the oscillating frequency f to some extent.

It is noted at this time that it may be possible to cause the lamp current to flow for an extended time within the all-off period by utilizing a bypass capacitor of larger capacitive value as much as several ten times the capacitor 2 forming the above oscillating circuit. However, it is impractical in that the circuit requires the correspondingly heavy and bulky capacitor. Also, it may be also possible to apply a higher voltage to the lamp L in an attempt to increase the energy to be stored in the capacitor 2 and consequently causes the lamp current to flow for a longer time as discharging the increased energy from the capacitor. However, it is still impractical in that the higher voltage applied to the lamp will certainly wear the electrodes of the lamp as well as require a high dc voltage source of costly electric component.

Figure 2:
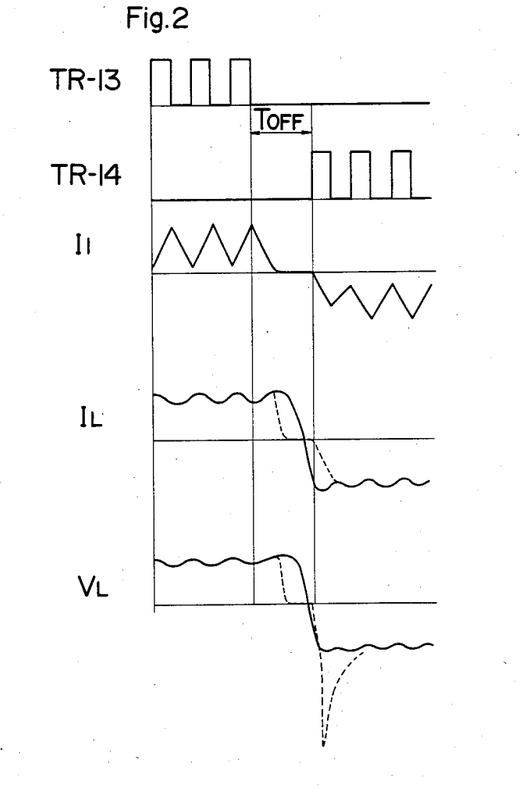
FIG. 2 illustrates timing diagram of pertinent waveforms occurring during the operation of the above circuit.
Figure 3:
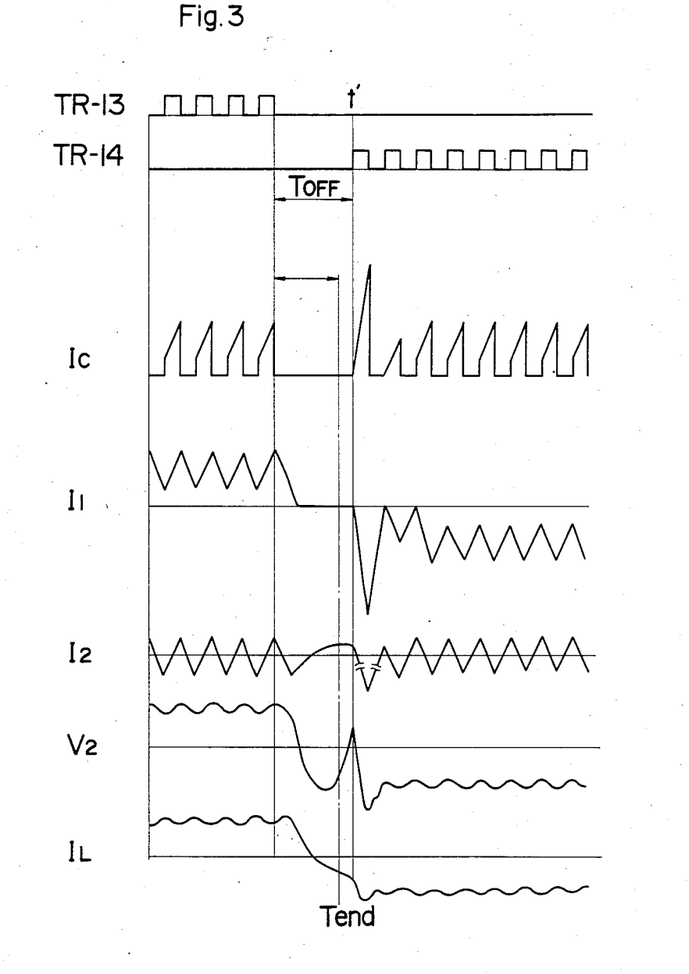
FIG. 3 illustrates timing diagrams of pertinent waveforms showing the occurrence of an undesirable effect when the all-off period is badly terminated.

Since the oscillating lamp current is flowing through the lamp L with its polarity reversed, as schematically shown in FIG. 2, the all-off period $T_{OFF}$ may be terminated at any time while the lamp current continues to flow. However, if the all-off period $T_{OFF}$ is terminated at an instant when the voltage appearing across the bypass capacitor 2 is in the same polarity with respect to the voltage to be applied across the lamp L and oscillation-inducing inductor 3 combination at the subsequent operation of turning on the corresponding one of the HF switching transistors 13 and 14, for example, at the instant t' as indicated in the timing diagram of FIG. 3, the voltage resulting from the bypass capacitor 2 would be added to the voltage to be applied by the bridge inverter 10 such that an increased current could momentarily rush through the current limiting inductor 1 into the circuit of the inverter 10, as indicated by the respective waveforms of the current $I_1$ flowing through the current limiting inductor 1 and the collector current Ic for the corresponding transistors. Upon this occurrence, the increased rushing or surge current which nearly doubles the normal current would saturate the inductor 1 to thereby reduce the current limiting effect to an unacceptable extent and at the same time would destroy the corresponding switching transistors.

Figure 4:
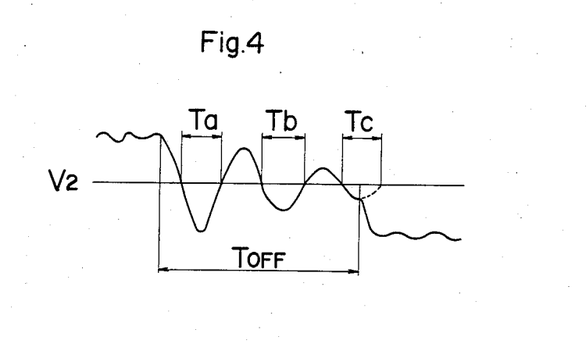
FIG. 4 is an explanatory waveform chart illustrating the oscillating voltage appearing in the all-off period provided in the operation of the above circuit.

For eliminating the above undesirable effect, the present invention contemplates that the all-off period $T_{OFF}$ is terminated at an instant $T_{end}$ when the voltage appearing across the bypass capacitor 2 is in the opposite polarity to the voltage to be applied by the bridge inverter 10. That is, with reference to FIG. 3, the all-off period $T_{OFF}$ should be terminated at $T_{end}$ indicated by a dotted line when the voltage across the capacitor 2 is a negative value. In FIG. 2, the all-off period $T_{OFF}$ is terminated within the one-cycle of the oscillating voltage, however, it is of course equally possible to terminate the all-off period $T_{OFF}$ within the next or further cycle of the oscillating voltage provided that the voltage across the bypass capacitor 2 is in the subtractive relation to the voltage to be applied to the lamp circuit. Therefore, referring to FIG. 4, the allowed timing of terminating the all-off period $T_{OFF}$ should be within any of ranges Ta, Tb, or Tc. The timing can be easily determined by selecting the reactive and resistive value of the oscillating circuit. With this result, the lamp L can be stably operated without being subjected to the harmful surge current, while affording enough all-off period to prevent the short circuiting.

It is to be noted at this time that the LF and HF switching transistors may be arranged in any location in the bridge circuit of the inverter other than illustrated in FIG. 1. Alternately, a bridge inverter having four HF switching transistors in two pairs may be applicable to the present invention in which the one pair of the HF switching transistors are controlled in a cooperative manner so as to alternately reverse the voltage to be applied to the lamp at the low frequency. Further, the two of the HF switching transistors forming the above alternate bridge inverter circuit may be replaced by suitable capacitors to form with the remaining pair of the HF switching transistors a so-called half-bridge-inverter circuit arrangement in which the HF switching transistors are controlled to alternately reverse the voltage at the low frequency.

Figure 5:
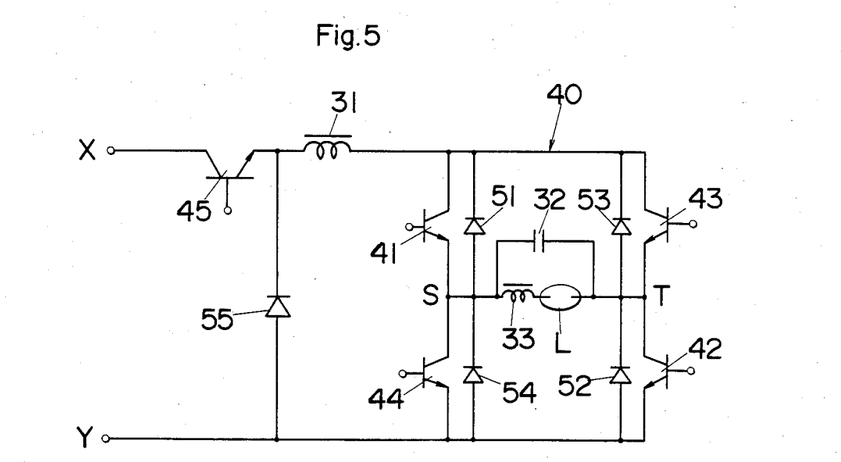
FIG. 5 is a schematic diagram of a discharge lamp driving circuit in accordance with another preferred embodiment of the present invention.

Referring to FIG. 5, there is shown another preferred embodiment which is similar to the above embodiment except that a single switching transistor 45 having a high switching frequency is combined to a bridge inverter 40 comprising four switching transistors 41 to 44 all operating at a lower switching frequency. In the bridge converter 40, the LF transistors 41 and 42 are controlled to be simultaneously conductive and non-conductive for applying a voltage across a series combination of discharge lamp L and oscillation-inducing inductor 33, while the LF transistors 43 and 44 are likewise controlled to apply the opposite voltage across the series combination. Diodes 51 to 54 are connected in anti-parallel relation with the LF transistors 41 to 44, respectively. A like high frequency bypassing capacitor 32 is connected in parallel with the series combination of lamp L and oscillation-inducing inductor 33. The HF switching transistor 45 is connected in series with a current limiting inductor 31 with its collector connected to the high voltage input terminal X and with its emitter connected to the inductor 31. A flywheel diode 55 is connected between the high voltage line and the common line of the circuit with its cathode connected to the junction of the HF transistor 45 and the current limiting inductor 31, so that when the HF transistor 45 is off a closed loop is established through the inductor 31, the pair of LF transistors remaining conductive, lamp L, and the flywheel diode 55 to sustain the lamp current, as in the like manner in the previous embodiment. The other operational features are the same as in the previous embodiment including the provision of the control circuit for the inverter and like oscillating circuit for causing the lamp current to flow continuously during the extended all-off period in which all of the transistors are off. The all-off period is also required in the circuit of the present embodiment for prevention of the short circuiting of the power supply, which short circuiting is in a broad sense to be understood to include the short circuiting of the inverter. Upon such occurrence, the switching transistors 41 to 44 are damaged or at least subjected to a harmful increased stress since the energy stored in the current-limiting inductor 31 is damagingly dissipated in the bridge circuit, such stress being of the same kind as developed in the circuit of the previous embodiment when suffering from the short circuiting.

Figure 6:
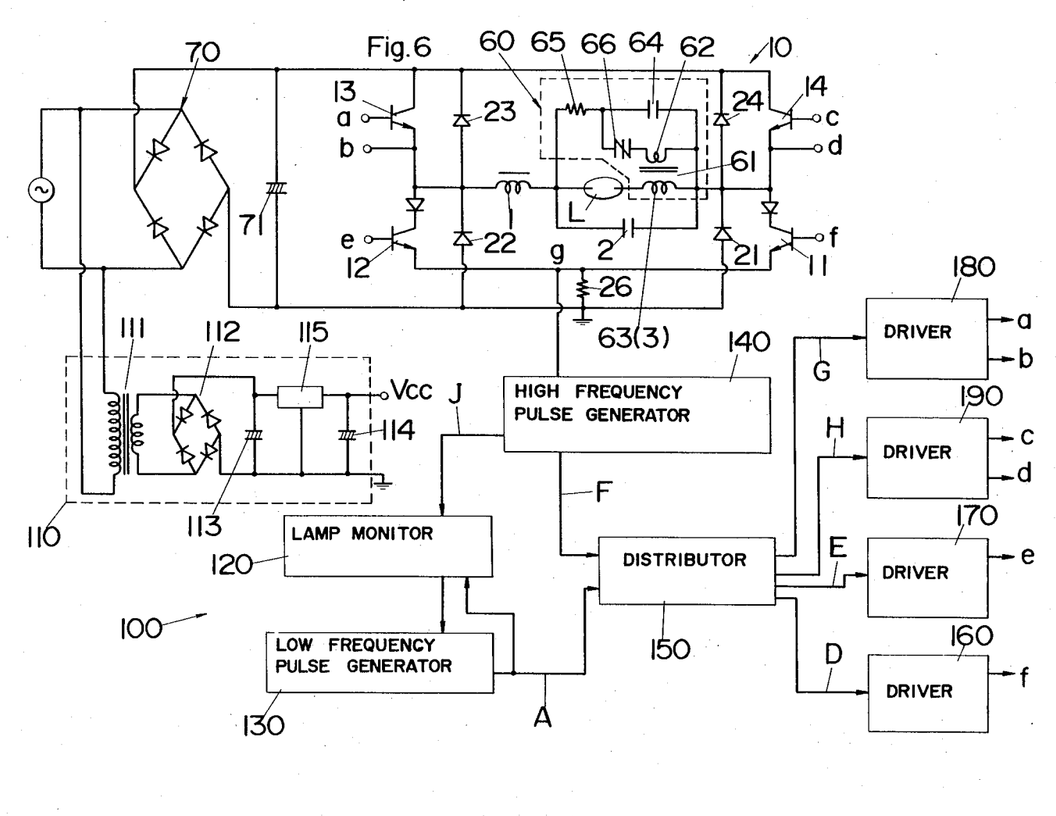
FIG. 6 is a schematic diagram in more concrete construction of the circuit of FIG. 1 including a starting circuit and a control circuit thereof.

Now referring to FIG. 6, there is shown a more detailed circuit diagram of the first embodiment of FIG. 1 in which a starting circuit 60 for the lamp L is included. Like numerals are employed to designate like parts as in the first embodiment for easy understanding of the circuit. The starting circuit 60 comprises a pulse transformer 61 having a primary winding 62 and a secondary winding 63, and a series combination of a pulse supply capacitor 64 and a resistor 65. The secondary winding 63 is connected in series with the lamp L and defining itself as a common element to the oscillation-inducing inductor 3. The combination of the lamp L and the secondary winding 63 (or oscillation-inducing inductor 3) is bridged by the bypass capacitor 2 to form the oscillating circuit which responds to the all-off period for supplying the oscillating lamp current. Also, the pulse supply capacitor 64 and resistor 65 combination is connected in parallel with the series combination of the lamp L and the secondary winding 63 (oscillation-inducing inductor 3). The primary winding 62 of the pulse transformer 61 is connected in series with a bidirectional diode thyristor 66, which combination is bridged by the pulse supply capacitor 64. The thyristor 66 supplies the charge from the capacitor 64 to the primary winding 62 of the pulse transformer 61 so as to provide a high open circuit voltage across the electrodes of the lamp L over the bypass capacitor 2, thus igniting the lamp L.

In FIG. 6, the DC power source 70 as illustrated comprises a bridge rectifier connected to a conventional AC voltage supply. The output voltage of the rectifier is applied through a filtering capacitor 71 to the bridge inverter 10. A control circuit 100 for the switching transistors 11 to 14 of the bridge inverter 10 is also illustrated in FIG. 6 and comprises a dc voltage source 110, lamp monitor 120, low frequency pulse generator 130, high frequency pulse generator 140, distributor 150, and drivers 160 to 190 for individual LF and HF switching transistors 11 to 14. The dc voltage source 110 includes a step-down transformer 111, diode bridge 112, capacitors 113, 114 and three-terminal regulator 115 for providing a stabilized dc voltage Vcc. The high frequency pulse generator 140 provides an output F to the corresponding drivers 180 and 190 through the distributor 150. Included in the high frequency generator 140 is a means which responds to the voltage across a current sensing resistor 26 incorporated in the lamp discharge circuit to vary duty cycle of the HF switching transistors 13 and 14 for maintaining the lamp operating condition at a desired level. The output J indicative of the current level through the resistor 26 is fed to the lamp monitor 120 where it is processed to determine whether or not the lamp L is in operation. The lamp monitor 120 provides the output indicative of the lamp condition to the low frequency pulse generator 130 in synchronization with the output of the latter.

The low frequency pulse generator 130 provides the output A to the drivers 160 and 170 for alternately switching on the corresponding LF transistors 11 and 12, the output A being sent together with the output F from the high frequency pulse generator 140 to the distributor 150 which in turn provides timing pulses D, E, G, and H to the respective drivers 160 to 190 in such a manner that each of the HF switching transistors 13 and 14 is rendered conductive only when the complementary LF switching transistor 11 or 12 remains conductive.

Figure 7:
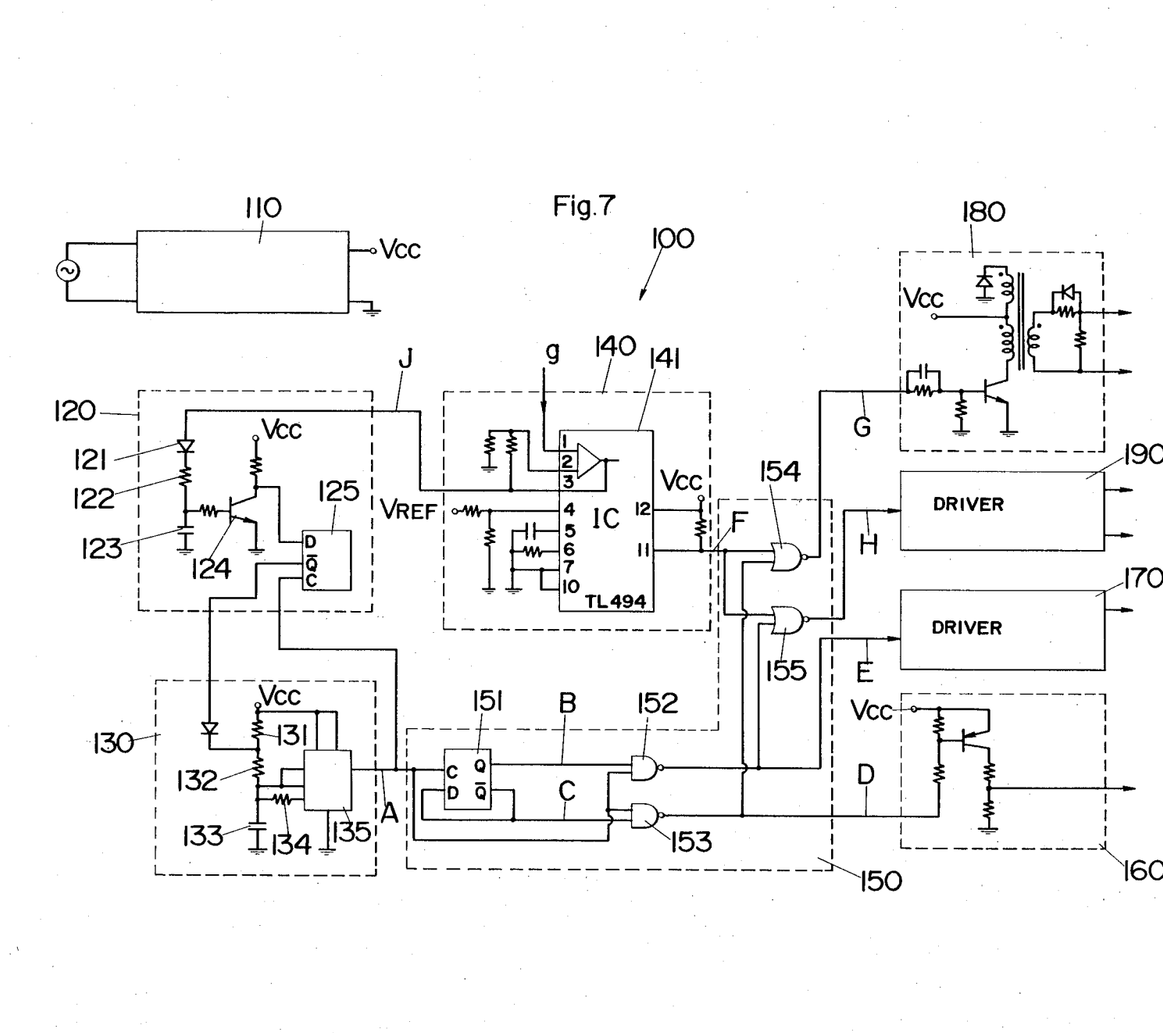
FIG. 7 is a schematic diagram of the above control circuit.

The detail operation of the control circuit will now be discussed with reference to FIG. 7. The high frequency pulse generator 140 includes a pulse width regulating IC chip 141 (TL494 available from Texas Instruments) provided with a differential amplifier receiving the input through pins 1 and 2. Pin 3 is utilized to share the output of the amplifier to the lamp monitor 120. Changing voltage across the current sensing resistor 26 results in the variation in the current in the main circuit of IC 141. When the resulting current increases, IC 141 responds to provide an output F through pin 11 so as to raise the duty cycle. The output J fed from pin 3 to the lamp monitor 120 is wave-shaped by the combination of a diode 121, resistor 122, and capacitor 123 for driving a transistor 124, which in turn causes a D-type flip-flop 125 (CMOS 4013) to provide a delayed output through $\bar{Q}$ terminal in synchronization with the output A fed to the clock terminal C of the flip-flop 125 from the low frequency pulse generator 130. The output of the lamp monitor 120 is responsible for changing the oscillating frequency of the low frequency pulse generator 130 depending upon whether or not the lamp L is in operation, i.e., for operating the LF switching transistors 11 and 12 at a frequency of about 100 Hz when the lamp L is operating and at a greatly reduced frequency of several hertz under a no load condition (lamp is off). The reason for reducing the switching frequency under a no load condition is for facilitating the transition of glow-discharge to arc-discharge of the lamp and therefore reducing the pulse energy required for starting circuit 60. The combination of resistors 131 and 132, capacitor 133 in the low frequency pulse generator 130 is responsible for determining the above reduced frequency, while the combination of resistor 132 and capacitor 133 is responsible for determining the switching frequency under a load condition (lamp is on). Resistor 134 is cooperative with capacitor 133 to determine the all-off period during which all of the LF and HF transistors 11 to 14 are off, as described in detail hereinbefore. Numeral 135 designates a timer IC chip, for example, NE555 available from SIGNETICS.

The output A of the low frequency pulse generator 130 is fed to a D-type flip-flop 151 in the distributor 150 which responds to provide outputs B and C. The outputs B and C go through NAND gates 152 and 153 to provide timing pulses D and E for actuating the drivers 160 and 170 of the LF switching transistors 11 and 12. NOR gates 154 and 155 provided in the distributor 150, in response to the outputs B, C, and F, provide timing pulses G and H for actuating the corresponding drivers 180 and 190 of the HF switching transistors 13 and 14.

Figure 8:
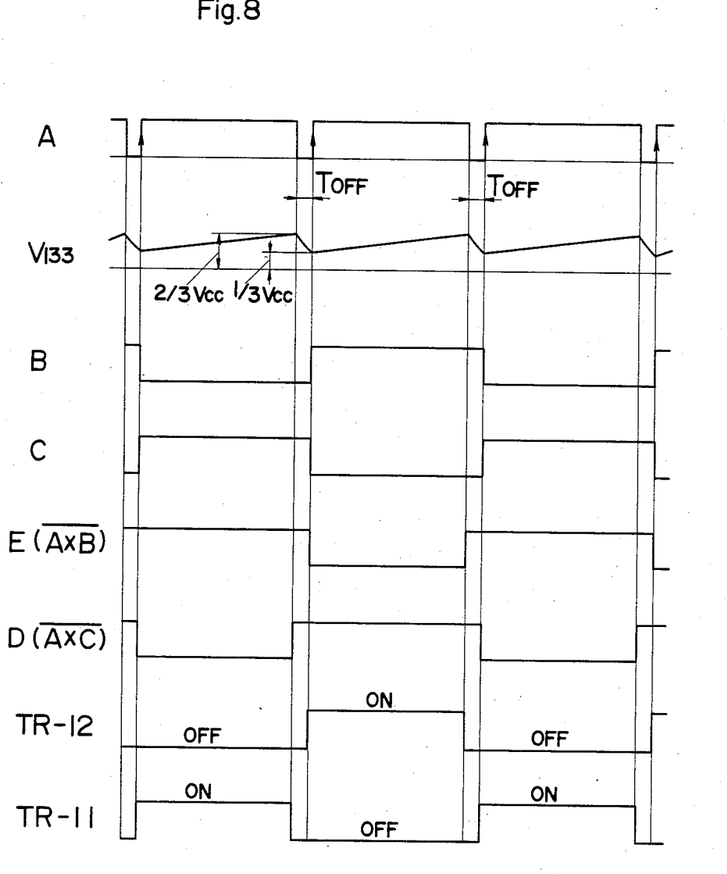
FIG. 8 illustrates timing diagrams of pertinent waveforms occurring during the operation of generating the low frequency pulses by the control circuit.
Figure 9:
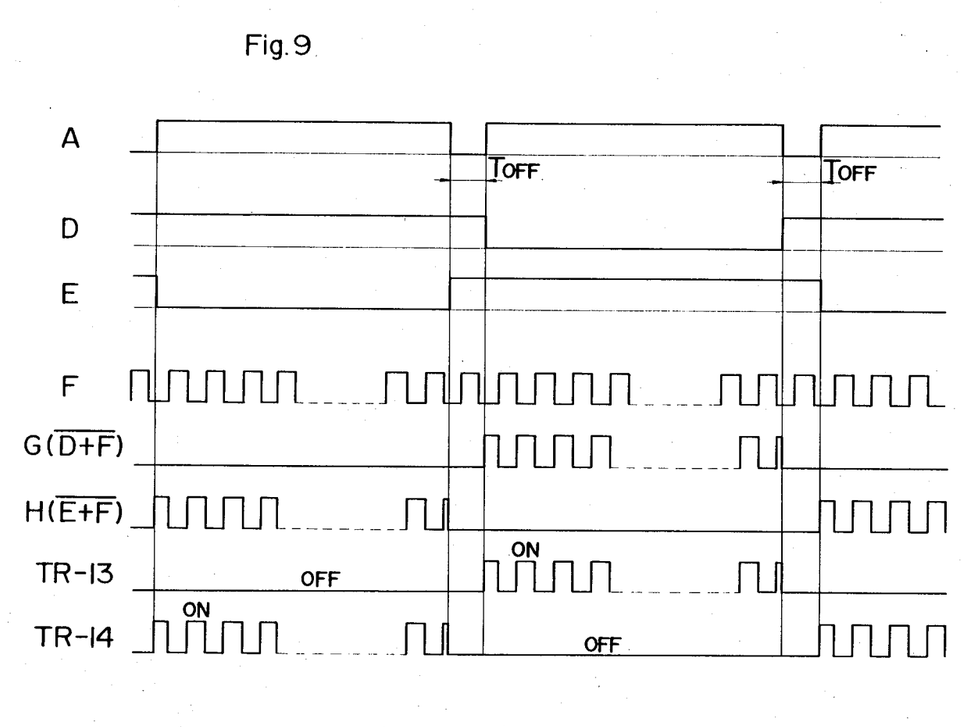
FIG. 9 illustrates timing diagrams of pertinent waveforms occurring during the operation of generating the high frequency pulses by the control circuit.

The above operation of the control circuit 100 can be more easily understood with reference to FIGS. 8 and 9. FIG. 8 illustrates the timing diagrams of the pertinent outputs utilized for operation of the LF switching transistors 11 and 12. As seen in the diagram, the voltage $V_{133}$ across the capacitor 133 in the low frequency pulse generator 130 is set to rise and fall between $\frac{1}{3}$ and $\frac{2}{3}$ of the reference voltage Vcc. The output A of the low frequency generator 130 is so arranged as to be at high level while $V_{133}$ is increasing from $\frac{1}{3}$ to $\frac{2}{3}$ of Vcc and to be at low level while the same is decreasing from $\frac{2}{3}$ to $\frac{1}{3}$ of Vcc, the latter interval defining the above all-off period $T_{OFF}$. The outputs B and C, which are in an inverted relation with each other, are obtained by utilizing the leading edge of the output A. The resulting outputs B and C are NAND gated respectively with the output A to provide the outputs E and D, which are responsible for the desired switching operations of the LF transistors 12 and 11, as illustrated in the bottom of the timing diagram of FIG. 8.

FIG. 9 illustrates the timing diagram of the pertinent outputs utilized for operation of the HF switching transistors 13 and 14. As seen in this figure, the outputs D and E obtained in the manner described are also utilized to be NOR gated respectively with the output F of the high frequency pulse generator 140 for providing the outputs G and H which are responsible for the desired switching operations of the HF transistors 13 and 14, as illustrated in the bottom of the diagram.

As seen in FIG. 9, a possible variation in the timing occurrence of the output F will result eventually in the fluctuation of the timing at which the HF switching transistor 13 or 14 becomes conductive. With this result, it might be presumed that the above described all-period $T_{OFF}$ fails to be terminated at the desired instant of satisfying the condition that the voltage across the bypass capacitor 2 is the subtractive relation to the voltage to be applied in the subsequent operation of the HF transistor 13 or 14. In other words, the HF transistor 13 or 14 might become conductive immediately after the lapse of the all-off period $T_{OFF}$ in such a timing as to apply the dc voltage in the same direction as the voltage appearing across the bypass capacitor 2, or more precisely at a timing which is not within the allowed ranges Ta, Tb, and Tc of FIG. 4.

Figure 10:
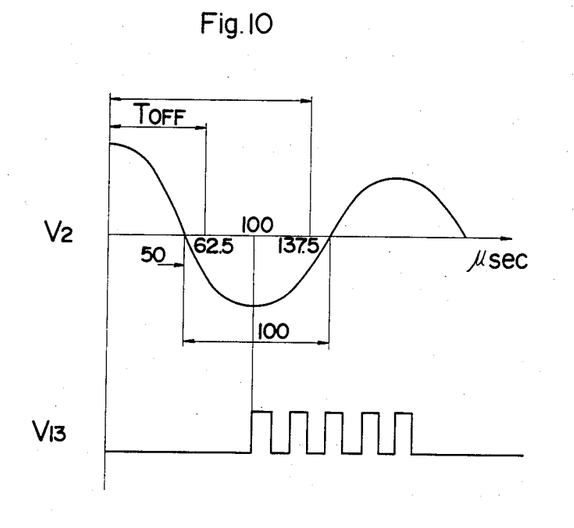
FIG. 10 is an explanatory waveform chart illustrating the desired timing relation between the end of the all-off period and the oscillating voltage appearing across the bypass capacitor with reference to the high frequency pulses of the switching transistor.

However, when considering that the oscillating voltage appearing across the bypass capacitor 2 during the all-off period $T_{OFF}$ has a relatively low frequency of about 5 KHz and therefore has a relatively long one-cycle period of about 200 μsec, or half-cycle of about 100 μsec, as described hereinbefore, while the HF switching transistors 13 and 14 have a higher frequency of 40 KHZ and therefore a shorter one-cycle period of 25 μsec (12.5 μsec), possible variation in the timing occurrence of the application of the on-pulse of the HF transistor 13 is 12.5 μsec at a maximum and therefore it can be well within the half-cycle period (100 μsec) of the oscillating voltage to be kept in the subtractive relation to the voltage to be applied to the lamp circuit. This is easily understood by the help of FIG. 10 in which all-off period $T_{OFF}$ is selected to be between 62.5 and 137.5 μsec so as to be terminated within the time interval of the negative half-cycle of the oscillating voltage which leads by 90° and 50 μsec, thus the possible variation will be found theoretically not to detract from the desired relation. Additionally, the above one-cycle period of the oscillating voltage will be rather elongated to some extent due to the fact that the oscillating circuit includes the resistance of the lamp itself, thus more flexibility is allowed in determining the oscillating voltage frequency in relation to the all-off period and the switching frequency of the HF transistors. Practically, it is found to be preferable that the all-off period is about 100 μsec.

Consequently, the desired relation between the voltage appearing across the bypass capacitor and the voltage to be applied to the lamp circuit at the onset of the high frequency pulse can be readily satisfied by suitably choosing the values of the bypass capacitor and the oscillation-inducing inductor in consideration of the all-off time period and the switching frequency of the HF transistors.

In this connection, it should be understand that the determined value for the constants of the oscillating circuit and for the all-off period are depicted by way of example only and that the present invention is not necessarily limited thereto.

What is claimed is:
1. A discharge lamp driving circuit, comprising:
 a DC voltage source;
 a discharge lamp;
 a current limiting inductor inserted in series between the voltage source and the lamp;
 means connected to the DC voltage for operating the lamp at a low frequency AC voltage while repetitively interrupting, at a high frequency, the voltage component to be applied to the lamp, said means comprising a bridge invertor having at least one pair of switching elements controlled to alternately reverse the DC voltage at the low frequency so as to apply the resulting AC voltage to the lamp at the low frequency, and switching means for repetitively interrupting, at the high frequency, the voltage component to be applied to the lamp;
 control means for providing an all-off period during which the switching elements of the bridge invertor are simultaneously off for a predetermined time interval at the polarity reversal of the AC voltage being applied to the lamp in order to prevent the power source from being short circuited through the circuit of the bridge invertor;
 a bypass capacitor connected in parallel with the lamp for bypassing the high frequency component resulting from the high frequency interrupting operation of the switching means; and
 an oscillation-including inductor connected in series with the lamp and in parallel relation with the bypass capacitor, said oscillation-inducing inductor forming, with said bypass capacitor, a series oscillating circuit which causes an alternating current to flow through the lamp during the all-off period.

2. A circuit as set forth in claim 1, wherein said oscillation-inducing inductor is selected to have an inductive value such that said all-off period terminates at a moment when the voltage appearing across the bypass capacitor by the operation of the oscillating circuit is in a subtractive relation to the voltage to be applied across the same capacitor in the subsequent operation of turning on the switching means with respect to the polarity of the voltage.

3. A circuit as set forth in claim 1, further including a starting circuit connected in series with the lamp, said starting circuit comprising:
 a pulse transformer having a primary winding and a secondary winding, the secondary winding defining itself said oscillation-inducing inductor forming the oscillating circuit; and
 pulse generating means connected to the primary winding of the pulse transformer whereby the pulse transformer produces a high open circuit ignition voltage across the lamp over said bypass capacitor.

4. A circuit as set forth in claim 1, wherein said bridge inverter comprises two pairs of switching transistors which are arranged in a bridge circuit and define said switching elements, the one pair of said switching transistor being operated at the low frequency so as to reverse the interrupted DC voltage for applying the AC voltage to the lamp, and the other pair of the switching transistors being operated at the high frequency so as to be utilized as said switching means.

5. A circuit as set forth in claim 1, wherein said inverter circuit comprises two pairs of switching transistor arranged in a bridge circuit to define said switching elements operated at the low frequency, and including another switching transistor defining said switching means operating at the high frequency, the latter switching transistor being connected between the DC voltage source and the inverter.

* * * * *